(12) United States Patent  (10) Patent No.: US 9,206,945 B2
Hirano et al.  (45) Date of Patent: Dec. 8, 2015

(54) SYSTEM AND METHOD FOR HYDROGEN STORAGE

(75) Inventors: Shinichi Hirano, West Bloomfield, MI (US); Jun Yang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 726 days.

(21) Appl. No.: 13/396,652

(22) Filed: Feb. 15, 2012

(65) Prior Publication Data

US 2013/0209353 A1 Aug. 15, 2013

(51) Int. Cl.
 *C01B 3/00* (2006.01)
 *F17C 11/00* (2006.01)
(52) U.S. Cl.
 CPC .............. *F17C 11/005* (2013.01); *Y02E 60/321* (2013.01)
(58) Field of Classification Search
 CPC ........................................................ C01B 3/00
 USPC ................ 206/0.07; 423/644–658.3; 420/900
 See application file for complete search history.

(56) References Cited

U.S. PATENT DOCUMENTS

| 2006/0081483 | A1* | 4/2006 | Chen et al. ................. 206/0.7 |
| 2007/0082816 | A1 | 4/2007 | Yang et al. |
| 2007/0227898 | A1 | 10/2007 | Muller et al. |
| 2009/0005243 | A1 | 1/2009 | Goddard et al. |
| 2010/0068134 | A1 | 3/2010 | Sudik et al. |

FOREIGN PATENT DOCUMENTS

| CN | 101270094 A | 9/2008 |
| CN | 101428755 A | 5/2009 |
| CN | 101596465 A | 12/2009 |
| JP | 2009227760 A | 10/2009 |
| WO | 2008009944 A2 | 1/2008 |
| WO | 2009093817 A2 | 7/2009 |
| WO | 2010042948 A2 | 4/2010 |

OTHER PUBLICATIONS

Murray et al. "Hydrogen storage in metal-organic framworks" 2009, Chemical Society Reviews, 38, p. 19450-1459.*
Yoo et al. "Atomic Hydrogen storage in Carbon Nanotubes Promoted by Metal Catalysts", 2004, J. Phys. Chem. B, 108, p. 18903-18907.*

(Continued)

*Primary Examiner* — Stanley Silverman
*Assistant Examiner* — Syed Iqbal
(74) *Attorney, Agent, or Firm* — Damian Porcari; Brooks Kushman P.C.

(57) ABSTRACT

In one aspect, a hydrogen storage system includes a sealed container including an inner temperature of 77 degrees Kelvin or greater, a sorbent material enclosed within the sealed container and including a sorbent substrate and a hydrogen splitting catalyst connected to the sorbent substrate via a chemical bond, and one or more hydrogen atoms enclosed within the sealed container. In certain instances, the one or more hydrogen atoms are connected to the sorbent material via interactions greater than Van der Waals interactions. In another aspect, a method of storing hydrogen includes: inputting molecular hydrogen to a sorbent material to form a charged sorbent material, the sorbent material including a sorbent substrate and a hydrogen splitting catalyst connected to the sorbent substrate via a chemical bond; and storing the charged sorbent material at a temperature of greater than 77 degrees Kelvin.

17 Claims, 2 Drawing Sheets

(56) References Cited

OTHER PUBLICATIONS

Callister Jr. et al. "Materials Science and engineering" $8^{th}$ edition. 2009, John Wiley & Sons, p. 33.*

Kitagawa Susumu, et al., Functional Porous Coordination Polymers, Angewandte Chemie Int. Ed., 43, 2004, pp. 2334-2375.

Farrusseng, David, et al., Metal-Organic Frameworks: Opportunities for Catalysis, Angewandte Chemie Int. Ed., No. 48, 2009, pp. 7502-7513.

Gan, Liangbing, et al., Preparation of Open-Cage Fullerenes and Incorporation of Small Molecules Through Their Orifices, Advanced Materials, No. 22, 2010, pp. 1493-1507.

Corma A., et al., Engineering Metal Organic Frameworks for Heterogeneous Catalysis, American Chemical Society, pp. 1-50.

Czaja, Alexander, et al., Industrial Applications of Metal-Organic Frameworks, Chemical Society Reviews, No. 38, 2009, pp. 1284-1293.

Murray, Leslie, J., et al., Hydrogen Storage in Metal-Organic Frameworks, Chemical Society Reviews, No. 38, 2009, pp. 1294-1314.

Lee, Jeong Yong, et al., Metal-Organic Framework Materials as Catalysts, Chemical Society Reviews, No. 38, Jan. 26, 2009, pp. 1450-1459.

Chahine, R., et al., Low-Pressure Adsorption Storage of Hydrogen, Int. J. Hydrogen Energy, vol. 19, No. 2, 1994, pp. 161-164.

Li, Yingwei, et al., Hydrogen Storage in Metal-Organic Frameworks by Bridged Hydrogen Spillover, Journal of American Chemical Society, No. 128, 2006, pp. 8136-8137.

Chung, T.C., Mike, et al., Synthesis of Microporous Boron-Substituted Carbon (B/C) Materials Using Polymeric Precursors for Hydrogen Physisorption, Journal of American Chemical Society, No. 130, 2008, pp. 6668-6669.

Li, Hailian, et al., Design and Synthesis of an Exceptionally Stable and Highly Porous Metal-organic Framework, Letters to Nature, vol. 402, Nov. 18, 1999, pp. 276-279.

\* cited by examiner

SYSTEM AND METHOD FOR HYDROGEN STORAGE

TECHNICAL FIELD

One or more embodiments of the present invention relate to a system and method for hydrogen storage.

BACKGROUND

Hydrogen is desirable as a secondary source of energy for many applications because its reaction with oxygen produces a clean by-product, i.e., water. Hydrogen has increasingly been considered as an environmentally clean energy carrier in the field of mobile or stationary applications. However, use of hydrogen as an energy carrier has met with many implementation challenges. For example, efficient on-board storage and release of hydrogen is identified as one of the key practical obstacles to realizing a transition to hydrogen-powered vehicles.

Sorbent materials have been indicated in hydrogen storage. In conventional applications, molecular hydrogen is adsorbed into sorbent materials via relatively weak forces, such as Van der Waals interactions. However, these sorbent materials have limited use because of the cost-prohibitive energy expenditures for maintaining the needed low temperatures. There is a continuing need for sorbent hydrogen storage materials with industrially acceptable cost efficiency for operation and maintenance.

SUMMARY

In one aspect, a method of storing hydrogen is provided. In one embodiment, the method includes: inputting molecular hydrogen to a sorbent material to form a charged sorbent material, the sorbent material including a sorbent substrate and a hydrogen splitting catalyst connected to the sorbent substrate via a chemical bond; and storing the charged sorbent material at a temperature of greater than 77 degrees Kelvin. In certain instances, the charged sorbent material is stored at a temperature of between 77 to 500 degrees Kelvin. In certain other instances, the charged sorbent material is storing at a temperature of between 123 to 353 degrees Kelvin.

In another embodiment, the method further includes the step of enclosing the charged sorbent material in a sealed container such that the charged sorbent material is maintained at a temperature of greater than 77 degrees Kelvin within the container.

In yet another embodiment, the charged sorbent material further includes at least one hydrogen atom attached to the charged sorbent material via chemisorption.

In yet another embodiment, the step of inputting further includes inputting a sorbent material having a noble metal as the hydrogen splitting catalyst. The chemical bond may be formed between the noble metal and an element selected from the group consisting of O, C, N, B, P, S, Se, F, Cl, Br, H, and combinations thereof.

In yet another embodiment, the sorbent material includes less than 5 percent by weight of carbon. In certain instances, the sorbent material includes less than 5 percent by weight of carbon in the form of carbon nanoparticles.

In another aspect, a hydrogen storage system is provided. In one embodiment, the hydrogen storage system includes a sealed container including an inner temperature of 77 degrees Kelvin or greater, a sorbent material enclosed within the sealed container and including a sorbent substrate and a hydrogen splitting catalyst connected to the sorbent substrate via a chemical bond, and one or more hydrogen atoms enclosed within the sealed container. In certain instances, the one or more hydrogen atoms are connected to the sorbent material via interactions greater than Van der Waals interactions.

DETAILED DESCRIPTION

Figure 1:
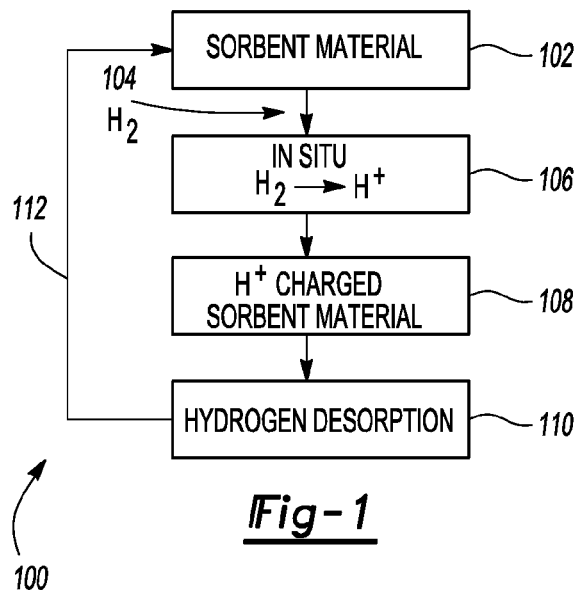
FIG. 1 depicts a hydrogen storage and desorption process according to one embodiment.

Reference will now be made in detail to embodiments of compositions, structures, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Introduction and acceptance of hydrogen-fueled vehicles, such as those utilizing hydrogen fuel cells and/or hydrogen internal combustion engine, very much depend on a safe, efficient, and cost-effective system and method for storing hydrogen fuel on-board. To achieve wide-spread commercial viability across diverse vehicle platforms, it is desirable that hydrogen-fueled vehicles achieve certain performance attributes without significantly increasing weight or volume to the vehicle.

Sorbent materials have been reported to have good storage capacity for hydrogen. However, hydrogen storage in sorbent materials comes with certain limitations. For instance, high levels of energy are often employed to maintain the hydrogen to be stored within the sorbent materials. These high levels of energy may be consumed to produce extremely low temperatures such as temperatures well below 77 degrees Kelvin to reduce and prevent dissociation of hydrogen from their storage sites within the sorbent materials.

A method of storing hydrogen, according to one or more embodiments of the present invention, is advantageous for providing hydrogen storage with increased robustness in operation and maintenance, and hence reduction in cost. In particular, the method including inputting molecular hydrogen to a sorbent material to form a charged sorbent material and storing the charged sorbent material at a temperature of greater than 77 degrees Kelvin, wherein the sorbent material includes a sorbent substrate and a hydrogen splitting catalyst connected to the sorbent substrate via a chemical bond. In at least certain embodiments, the charged sorbent material is stored at a pressure of 1 to 700 bar.

During operation, molecular hydrogen may be introduced into the sorbent material, gets hydrolyzed in situ by the catalyst into atomic hydrogen. As atomic hydrogen has a relatively higher affinity to the sorbent substrate than molecular hydrogen, hydrogen can be stored within the sorbent material without necessarily needing any extreme energy relative to storing hydrogen in conventional systems. Without wanting to be limited to any particular theory, it is believed that a hydrogen splitting catalyst may be introduced into, and in certain instance, may be built into, the sorbent substrate as an integral part via chemical bonds. In this arrangement, any given amount of the hydrogen splitting catalyst can be spread across the entire volume of the sorbent substrate, hydrogen splitting efficiency, and hence hydrogen storage efficiency, per unit weight of the catalyst can be substantially improved. In particular, the hydrogen splitting catalyst can be connected to the sorbent substrate via chemical bonds, thus making each of the metal atoms effectively accessible for the hydrogen splitting reactions. This design synergizes both a reduction in precious metal consumption and a relaxation of temperature requirement for keeping the hydrogen within the sorbent material.

In one aspect, and as depicted in FIG. 1, a hydrogen adsorption and desorption process is generally shown at 100. At step 102, there is provided a sorbent material including a built-in hydrogen splitting catalyst, which is described in more details below. At step 104, molecular hydrogen is introduced into the sorbent material. At step 106, molecular hydrogen gets hydrolyzed or split into atomic hydrogen through the in situ splitting action by the hydrogen splitting catalyst in the sorbent material. At step 108, one or more hydrogen atoms are connected to the sorbent material via chemisorption, or a chemical bond, to form a charged sorbent material. Because atomic hydrogen is chemically bonded, possibly via one or more chemical bonds, to the sorbent material at this charged state, the charged sorbent material may be stored at at temperatures less stringent than those for storing molecular hydrogen via physisorption. At step 110, stored atomic hydrogen may be released via temperature or pressure adjustment to reform molecular hydrogen for desorption. The leftover sorbent material with hydrogen discharged may be recharged through step 112 to repeat one or more of the steps 102 to 110.

In one or more embodiments, term "desorption of hydrogen" refers to liberation of hydrogen from the hydrogen storage material. It is not intended to indicate that complete release has necessarily occurred, and contemplates both a complete release and a partial release resulting from liberation of at least part of the hydrogen content of the material.

Figure 2:
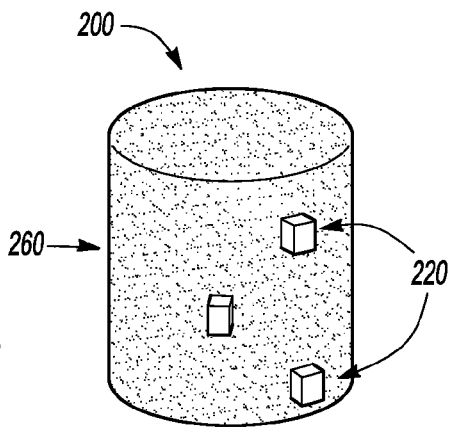
FIG. 2 depicts a perspective view of a hydrogen storage system according to another embodiment.

In one embodiment, and as illustratively shown in FIG. 2, a hydrogen storage system 200 includes one or more sorbent materials 220; and a container 260 enclosing the sorbent material 220 and having an internal temperature of greater than 77 degrees Kelvin (not shown). In certain instances, and as illustratively depicted in FIG. 3A, a sorbent material 220a includes a sorbent substrate 322 and a hydrogen splitting catalyst 324 connected to the sorbent substrate 322 via a chemical bond 326. Due to direct chemical bonding between the hydrogen splitting catalyst 324 and the sorbent substrate 322, molecular hydrogen 362 can be very close in distance to the hydrogen splitting catalyst 324. As a result, molecular hydrogen 362, upon contacting the hydrogen splitting catalyst 324, gets split into atomic hydrogen 364. The atomic hydrogen 364 may be stored close-by, or in situ, via chemisorption. In certain instances, the term of "chemisorption" refers to an attachment or connection that is stronger in force than Van der Waals interactions. In certain instances, the chemisorption may be equivalent in force to a chemical bond. Without wanting to be limited to any particular theory, molecular hydrogen attaches or connects to a sorbent material via physisorption, a much weaker force relative to chemisorptions. As a result, molecular hydrogen can be desorbed from a sorbent material relatively more easily than atomic hydrogen and therefore, must be maintained at extremely low temperatures for storage. With this in situ accessibility in the sorbent material for hydrogen splitting, the hydrogen storage system, according to one or more embodiments of the present invention, may be advantageously used for storing hydrogen at a temperature that is more energy-efficient.

Figure 3A:
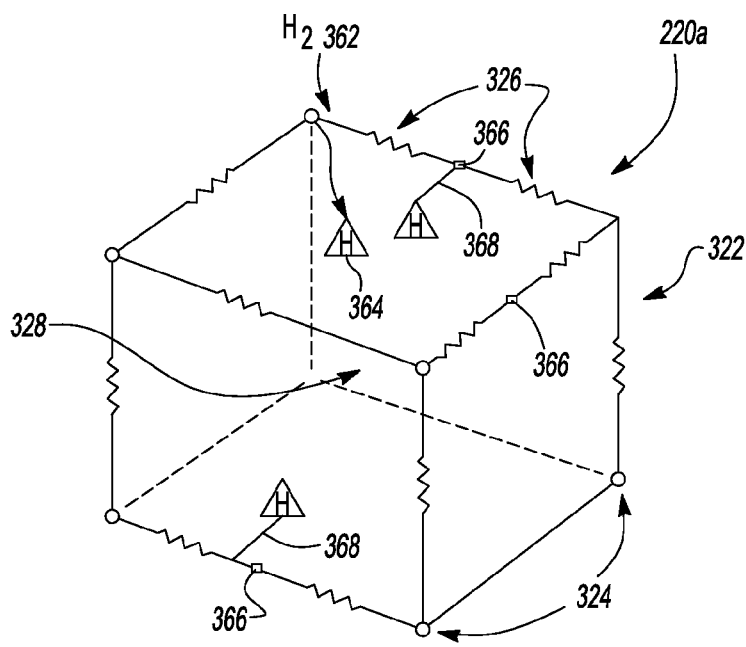
FIG. 3A depicts a partial illustrative view of a sorbent material of the hydrogen storage system of FIG. 2.

Referring back to FIG. 2 and FIG. 3A, the sorbent substrate 322 defines one or more cavities 328 where molecular hydrogen may be at least temporarily stored for easy access to the hydrogen splitting catalyst 324. Although hydrogen splitting catalyst 324 is depicted at corners of the sorbent substrate 322, it is appreciated that the sorbent substrate 322 may take any suitable shape and form and the hydrogen splitting catalyst 324 may be positioned in the sorbent substrate 322 at any suitable position. In certain instances, and as depicted in FIG. 3A, the hydrogen splitting catalyst 324 is connected to a connecting element 366 of the sorbent substrate 322 via a chemical bond 326. Upon the splitting action of the hydrogen splitting catalyst 324, atomic hydrogen 364 may be connected to the sorbent substrate 324 via a chemical bond 368. The chemical bond 368 may be formed between the atomic hydrogen 364 and another structural element of the sorbent substrate 22 such as the connecting element 366, the hydrogen splitting catalyst 324 itself, or the chemical bond 326.

Non-limiting examples of the connecting element 366 with which hydrogen splitting catalyst 324 can form a chemical bond include O, C, N, B, P, S, Se, F, Cl, Br, H, and combinations thereof. The chemical bond may be a direct chemical bonding involving the hydrogen splitting catalyst 324, or may also be structurally a ligand including a series of chemical bonds such that the connection between the hydrogen splitting catalyst 324 and the connecting element 366 may be indirect.

In one or more embodiments, the term "chemical bond" refers to an attraction between atoms that allows the formation of chemical substances containing two or more atoms. The bond is caused by the electromagnetic force attraction between opposite charges, either between electrons and nuclei, or as the result of a dipole attraction. Non-limiting examples of the chemical bonds include intra-molecular bonds such as covalent bonds, ionic bonds and metallic bonds and intermolecular bonds such as hydrogen bonds. In certain instances, the chemical bond such as chemical bond 326, 336, 346, and 356 is stronger in force than a metallic bond. In certain particular instances, the chemical bond such as chemical bond 326, 336, 346, 356 is a covalent bond.

In one or more embodiments, the term "metallic bond" refers to the electromagnetic interaction between delocalized electrons or conduction electrons gathered in an "electron sea", and the metallic nuclei within metals. In this type of interactions, free electrons are shared among a lattice of positively charged ions or cations.

In one or more embodiments, the term "covalent bond" refers to a form of chemical bonding that is characterized by the sharing of pairs of electrons between atoms. In short, the stable balance of attractive and repulsive forces between atoms when they share electrons is known as covalent bonding. In many instances, the covalent bond is believed to be stronger in force than a metallic bond.

The sorbent substrate 322 with or without the hydrogen splitting catalyst 324 can be referred to as porous lightweight materials that possess relatively high surface areas to which hydrogen can adsorb, for instance via physisorption mechanism for molecular hydrogen and chemisorption for atomic hydrogen. For most sorbents, the amount of hydrogen adsorbed is typically proportional to a sorbent's surface area. Atomic hydrogen may adsorb much like molecular hydrogen in certain instances. However, because of the chemical bonding involved in atomic hydrogen adsorption, atomic hydrogen attach more firmly than molecular hydrogen. In certain instances, activated carbon, aerogels, and foams may be not be suitable candidates for the sorbent substrate 322, as these materials do not have or do not have the capacity for built-in hydrogen splitting catalysts. These materials may include hydrogen splitting catalysts by the process of doping, but not by chemical bonding. Therefore, hydrogen splitting catalysts, if present, are merely mixed in or doped in, but not built-in as part of the chemical structure of the sorbent materials.

Non-limiting examples of the sorbent substrate 322 with or without the hydrogen splitting catalyst 324 include crystalline framework-like compounds such as metal-organic frameworks (MOFs), covalent organic frameworks (COFs), zeoliticimidazolate frameworks (ZIFs).

Figure 3B:
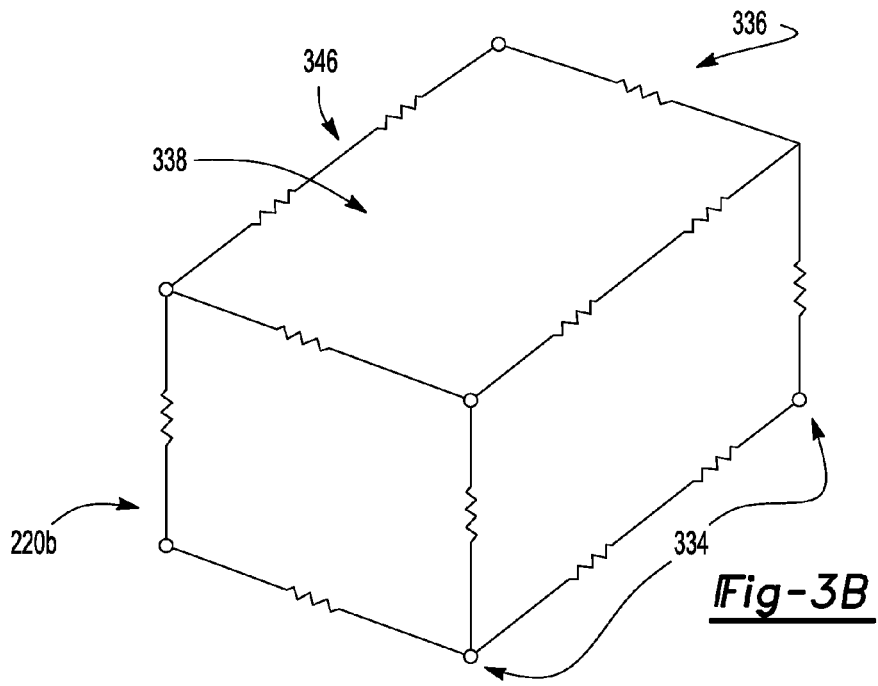
FIG. 3B depicts another partial illustrative view of a sorbent material of the hydrogen storage system of FIG. 2.

In yet another embodiment, as shown in FIG. 3B, a sorbent material 220b includes hydrogen splitting catalyst 334 bridged with a first bridging ligand 336 and a second bridging ligand 346. The second bridging ligand 346 is chemically and/or structurally different from the first bridging ligand 336. Each of the first and second bridging ligands 336, 346 may independently include one or more chemical bonds. For instance, the second bridging ligand 346 may be electronically conductive and different in chain length from the first bridging ligand 336. This hydrogen storage material 220b is thus a heterorecticular MOF crystal. The hydrogen storage catalyst 334, the first bridging ligand 336 and the second bridging ligand 346 collectively define one or more cavities 338.

Figure 3C:
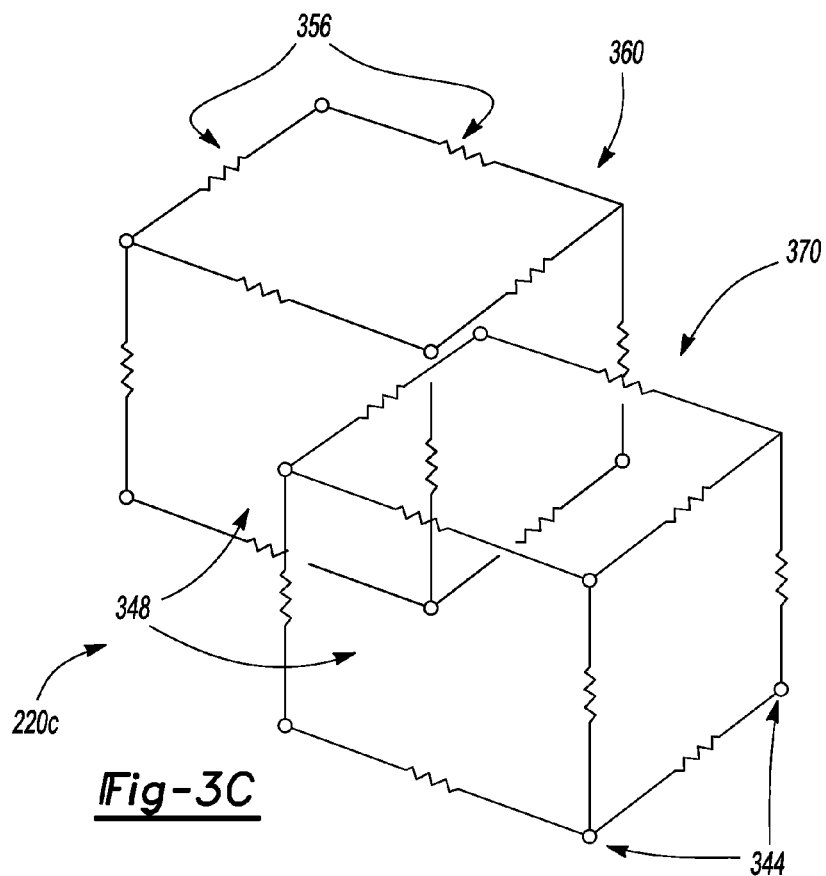
FIG. 3C depicts another partial illustrative view of a sorbent material of the hydrogen storage system of FIG. 2.

In yet another embodiment, as illustrated in FIG. 3C, a hydrogen storage material 220c includes an interpenetrating network of two MOFs 360 and 370. MOF 370 partially interpenetrates MOF 360. Hydrogen splitting catalyst 344 and bridging ligands 356 define cavity 348 into hydrogen atoms and/or molecules may be stored. The cavity size for MOF 360 may be reduced relative to the cavity size for MOF 370 as MOF 370 interpenetrates MOF 360. Having interpenetrating MOFs may result in certain reduction of the absolute pore capacity, but the pore capacity and transfer of gas molecules between MOF crystals may be controlled by having interpenetrating MOFs. Each of the bridging ligands 356 may independently include one or more chemical bonds.

Referring back to FIG. 2 and FIG. 3A, because hydrogen splitting catalyst 324 is directly connected to the sorbent substrate 322 via chemical bonds, no additional support materials such as carbon, and carbon bulk and/or carbon nanoparticles in particular, are necessarily needed to present the hydrogen splitting catalyst 324 to the sorbent substrate 322. Therefore, in certain instances, the hydrogen storage system 200 does not include any carbon in any measureable amount. For instance, the hydrogen storage system 200 includes less than 5 percent, 2.5 percent, 1.0 percent, or 0.1 percent by weight of carbon.

Non-limiting examples of the MOFs include an inorganically solvated MOF, such as Pt@[Zn4O(BDC)3], Cu@[Zn4O(BDC)3], and Pd@[Zn4O(BDC)3]; an organically solvated MOF, such as Ti(OiPr)4[Cd3Cl6(LI)3.4DMF.6MeOH.3H2O, Ti(OiPr)4[Cd3(NO3)6(LI)4.7MeOH.5H2O, Ti(OiPr)4[Cd(LI)2(H2O)2][ClO4]2.DMF.4MeOH.3H2O, [Rh2(M2+TCPP)2], where M2+ may include Cu, Ni, or Pd, and [Zn2(BPDC)2(L2)].10DMF.8H2O; an ionically or partially ionically solvated MOF, such as [Ni(L-aspartate)bpy0.5]HCl0.9MeOH0.5, [Cu(L-aspartate)bpy0.5]HCl, [Cu(D-aspartate)bpy0.5]HCl, [Cu(L-aspartate)bpy0.5]HCl, [Cu(D-aspartate)bpy0.5]HCl, Cr3(F,OH)(en)2O(BDC)3(ED-MIL-101), Cr3(F,OH)(en)2O(BDC)3(ED-MIL-101), [Zn3O(L3-H)].(H3O)2(H2O)12(D-POST-1), [Sm(L4-H2)(L4-H3)(H2O)4].(H2O)x, [Cu(bpy)(H2O)2(BF4)(bpy)], [Zn4O(BDC)3](MOF-5), [Ln(OH)H2O)(naphthalenedisulfonate)] where Ln includes a lanthanide metal such as Nd, Pr, or La; as well as [In4(OH)6(BDC)3], [Cu3(BTC)2], [Sc2(BDC)3], [Sc2(BDC)2.5(OH)], [Y2(BDC)3(H2O)2].H2O, [La2(BDC)3(H2O)2].H2O, [Pd(2-pymo)2], [Rh2(H2TCPP)2]BF4, [Cu2(trans-1,4 cyclohexanedicarboxy-late)2]H2O, [Cu(2-pymo)2], [Co(PhIM)2], [In2(BDC)3(bpy)2], [In2(BDC)2(OH)2(phen)2], [In(BTC)(H2O)(bpy)], [In(BTC)(H2O)(phen)], [Sc2(BDC)2.5(OH)], [Y2(BDC)3(H2O)2].H2O, [La2(BDC)3(H2O)2]H2O, [Cu3(BTC)2], [Sm(L4-H2)(L4-H3)(H2O)4].(H2O)x, Mn3[(Mn4Cl)(BTT)8(MeOH)10]2, [Zn4O(BDC)3](MOF-5), Ti-(2,7-dihydroxynaphthalene)-MOF, [Pd(2-pymo)2], [Cu3(BTC)2], [Cu3(BTC)2], [Cu3(BTC)2], [Rh2(L5)], [Rh(BDC)], [Rh(fumarate)], [Ru(1,4-diisocyanobenzene)2]Cl2, [In4(OH)6(BDC)3], [Ru2(BDC)2], [Ru2(BPDC)2], [Ru2(BDC)2(dabco)], [Ru2(BPDC)2(dabco)], [Rh2(fumarate)2], [Rh2(BDC)2], [Rh2(H2TCPP)2], and [Pd(2-pymo)2].

In certain instances, non-limiting examples of the MOFs include: Ni(cyclam)(BPYDC); $Ni_2(BPY)_3(NO_3)_4(M)$; $Ni_3(BTC)_2(3-PIC)_6(PD)_3$; $NaNi_3(OH)(SIP)_2$; [RhCl(CO)(1,4-dicb)]; [RhCl(CO)(4,4-dicbp)$_2$]; [RuCl$_2$(1,4-dicb)$_2$][RuCl$_2$(1,4-dicb)$_3$]; [Pd(2-pymo)$_2$]; [Co(bzim)$_2$](ZIF-9); [Co(bpb)](MFU-3); [Na$_{20}$(Ni$_8$(4,5-IDC)$_{12}$]; MIL-200(Fe); [Ni$_2$(H$_2$O)$_2$(2,3-pydca)$_2$(4,4'-bpy)$_2$-U$_5$O$_{14}$(OAc)$_2$].2H$_2$O; [Co$_2$(4,4'-bpy)(oba)$_2$][Ni$_2$(4,4'-bpy)(oba)$_2$][Zn$_2$(4,4'-bpy)(oba)$_2$]. Without wanting to be limited to any particular theory, these materials are selected in certain instances because they have built-in hydrogen splitting catalysts and are relatively economical at least in material cost In one or more embodiments, the MOF is a porous coordination network (PCN) having at least one entactic metal center (EMC), such as PCN-9 MOF. The EMC is an unusual geometry imposed by a ligand on a metal center in the MOF for the purpose of enhancing the MOF's affinity for hydrogen. Non-limiting examples of imposed geometry include adapting organic positive electrode units to generate a pore comparable to the size of the oxygen molecule and introducing a coordinatively unsaturated metal center, such as a metal cation cluster. A combination of several EMCs may create a secondary building unit (SBU) within the MOF suitable for exceptional gas sorption affinity as determined by adsorption isotherms collected at various temperatures and fitted using the Langmuir-Fruendlich equation.

In one or more embodiments, the present invention is advantageous in providing a sorbent-based hydrogen storage system that is operable to store hydrogen at certain pressures that are energy friendly, not otherwise possible with certain sorbent systems in the art. Therefore, the hydrogen storage system 200 can be used with improved robustness wherein relatively less stringent pressure and/or temperature may be used. For instance, the hydrogen storage system 200 can be operable at a pressure of no greater than 700 bar, 600 bar, 500 bar, 400 bar, 300 bar, 200 bar. Moreover, the reduction in operating pressure also improves the potential robustness due to the associated stress levels. A relatively higher pressure system often requires additional stresses and failure modes, which could increase the system cost and design complexity to manage these robustness items including sealing, permeation, and metal embrittlement. For instance, the tanks configured for operation at 200 bar or lower cost significantly less relative to 700 bar tanks. In certain instances, the container 360 may not require load-bearing liner or full-wrapped fiber reinforcement.

In yet another embodiment, the hydrogen storage method enables storing hydrogen at a relatively less stringent temperature, for instance a non-cryogenic temperature that does not necessarily require a great amount of energy to form and/or to maintain, as compared to the conventional storage systems that uses cryogenic or para-cryogenic conditions wherein a temperature of more negative than 123 degrees Kelvin may be required. In certain instances, the temperature at which the hydrogen storage system is to be maintained can be in a range of from 77 to 500 degrees Kelvin, or from 123 to 353 degrees Kelvin.

In at least one embodiment, the hydrogen splitting catalyst 324, 334, 344 has a weight percent of from 1 percent to 70 percent, 2 percent to 55 percent, 3 percent to 40 percent, or 4 percent to 25 percent, depending upon particular crystal structures involved in the storage substrate.

In yet another embodiment, the hydrogen splitting catalyst 324, 334, 344 may be any metal material that is capable of hydrolyzing molecular hydrogen into atomic hydrogen. Non-limiting examples of the metal atom M include Pd, Pt, Rh, Ru, Ir, Au, Re, lanthanides, Fe, Co, Ni, or a combination thereof, and M could be on linker or secondary building units; metal doped other high surface area sorbents, such as zeolites, activated carbon, boron nitrogen compounds, or any other organic or inorganic compounds with high surface areas. In certain instances, metal doped sorbents are not particularly suitable for carrying out one or more embodiments of the present invention, as in metal doped sorbents, catalytic metal elements are merely added onto the sorbent surface and are not structural part of the sorbents. The lanthanides may include one or more of La, Ce, Pr, Nd, Pm, Sm, Eu, Gd, Tb, Dy, Ho, Er, Tm, Yb, and Lu.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of storing hydrogen comprising:
   inputting molecular hydrogen to a sorbent material to form a charged sorbent material, the sorbent material including a sorbent substrate and a hydrogen splitting catalyst connected to the sorbent substrate via a chemical bond; and
   storing the charged sorbent material at a temperature of greater than 77 degrees Kelvin, wherein the charged material is stored at a pressure of 1 to 700 bar and further includes at least one hydrogen atom attached to the charged sorbent material via an interaction greater than Van der Waals interaction.

2. The method of claim 1, wherein the charged sorbent material is stored at a temperature of between 77 to 500 degrees Kelvin, and wherein the sorbent material is porous.

3. The method of claim 1, wherein the charged sorbent material is stored at a temperature of between 123 to 353 degrees Kelvin.

4. The method of claim 1, wherein the charged sorbent material is stored in a closed container at a temperature of greater than 77 degrees Kelvin.

5. The method of claim 1, wherein molecular hydrogen is inputted into a sorbent material having palladium, platinum, rhodium, ruthenium, iridium, gold, rhenium, or a combination thereof as the hydrogen splitting catalyst.

6. The method of claim 5, wherein the chemical bond is formed between the hydrogen splitting catalyst and an element selected from the group consisting of O, C, N, B, P, S, Se, F, Cl, Br, H, and combinations thereof.

7. The method of claim 1, wherein the sorbent material includes 0.1 to 4.9 percent by weight of carbon, carbon nano-particles, or both.

8. The hydrogen storage system of claim 1, wherein the sorbent material includes 0.1 to 4.9 percent by weight of carbon in the form of bulk carbon or carbon nano-particles.

9. The hydrogen storage system of claim 1, wherein the sorbent material includes carbon in the form of bulk carbon or carbon nano-particles present in an amount of less than 5 wt %.

10. The hydrogen storage system of claim 1, wherein the sorbent material includes metal-organic frameworks, covalent organic frameworks, zeoliticimidazolate frameworks, or a combination thereof.

11. A hydrogen storage system comprising:
    a sealed container including an inner temperature of 77 degrees Kelvin or greater;
    a sorbent material enclosed within the container including a substrate and a catalyst comprising palladium, platinum, rhodium, ruthenium, iridium, gold, rhenium, or a combination thereof connected to the substrate via a chemical bond; and
    one or more hydrogen atoms enclosed within the container connected to the sorbent material via interactions greater than Van der Waals interactions.

12. The hydrogen storage system of claim 11, wherein the chemical bond is formed between the hydrogen splitting catalyst and an element selected from the group consisting of O, C, N, B, P, S, Se, F, Cl, Br, H, and combinations thereof.

13. A hydrogen storage system comprising:
    a sealed container including an inner temperature of 77 degrees Kelvin or greater;
    a porous sorbent material enclosed within the sealed container, the sorbent material including a sorbent substrate and a hydrogen splitting catalyst connected to the sorbent substrate via a chemical bond; and
    one or more hydrogen atoms enclosed within the sealed container, wherein the charged material is stored at a pressure of 1 to 700 bar and further includes at least one hydrogen atom attached to the charged sorbent material via an interaction greater than Van der Waals interaction.

14. The hydrogen storage system of claim 13, wherein the sealed container includes an inner temperature of between 77 to 500 degrees Kelvin.

15. The hydrogen storage system of claim 13, wherein the sealed container includes an inner temperature of between 123 to 353 degrees Kelvin.

16. The hydrogen storage system of claim 13, wherein the hydrogen splitting catalyst includes palladium, platinum, rhodium, ruthenium, iridium, gold, rhenium, or a combination thereof.

17. The hydrogen storage system of claim 16, wherein the chemical bond is formed between the palladium, platinum, rhodium, ruthenium, iridium, gold, rhenium, or a combination thereof and an element selected from the group consisting of O, C, N, B, P, S, Se, F, Cl, Br, H, and combinations thereof.

* * * * *